Dec. 4, 1923.  
J. B. ROBBINS  
SEALING DEVICE FOR WRAPPERS  
Filed Jan. 15, 1923    2 Sheets-Sheet 1

1,476,419

James B. Robbins
INVENTOR

BY *Victor J. Evans*
ATTORNEY

WITNESS: *R. E. Wise*

Dec. 4, 1923.

J. B. ROBBINS 1,476,419

SEALING DEVICE FOR WRAPPERS

Filed Jan. 15, 1923    2 Sheets-Sheet 2

James B. Robbins
INVENTOR

BY *Victor J. Evans*
ATTORNEY

*R. E. Wise.*

WITNESS:

Patented Dec. 4, 1923.

1,476,419

UNITED STATES PATENT OFFICE.

JAMES B. ROBBINS, OF CROWLEY, LOUISIANA.

SEALING DEVICE FOR WRAPPERS.

Application filed January 15, 1923. Serial No. 612,874.

*To all whom it may concern:*

Be it known that I, JAMES B. ROBBINS, a citizen of the United States, residing at Crowley, in the parish of Acadia and State of Louisiana, have invented new and useful Improvements in Sealing Devices for Wrappers, of which the following is a specification.

For sanitary reasons, baker's bread is required in several States of the Union to be encased in a wrapper before delivery from the baker. The wrapped bread must be sealed. Bakers have found waxed paper to be hygienic as well as an air-tight casing and therefore a preservative for bread wrapped therein, and it is the object of this invention to provide a simple, cheap and effective means in the nature of a chute through which the wrapped bread is caused to pass and which is provided with means for first heating the wrapper to soften or melt the wax on the folded ends and edge of the wrapper to create an adhesive agent and thereafter subject the wrapper, to the influence of a cool temperature to harden the softened wax, and thus effectively seal the package.

To the attainment of the foregoing and other objects which will present themselves as the nature of the invention is better understood, reference is to be had to the drawings which accompany and which form part of this application.

As disclosed by the drawings, I make use of two troughs, 1 and 2 respectively. The trough 2 is of a greater length than the trough 1, but in other respects, the troughs are equally proportioned. Each trough is in the nature of a hollow shell, the trough 1 being preferably constructed of metal, but the trough 2 may be constructed of other material, if desired.

Each trough includes a flat base comprising, of course, upper and lower walls, and right angular upstanding sides which likewise comprise spaced walls. The top and edges secure the spaced walls of the base and sides in proper spaced relation to each other, and the distance between the walls equals the length of a baker's loaf after the same has been wrapped in waxed paper.

Figure 1:
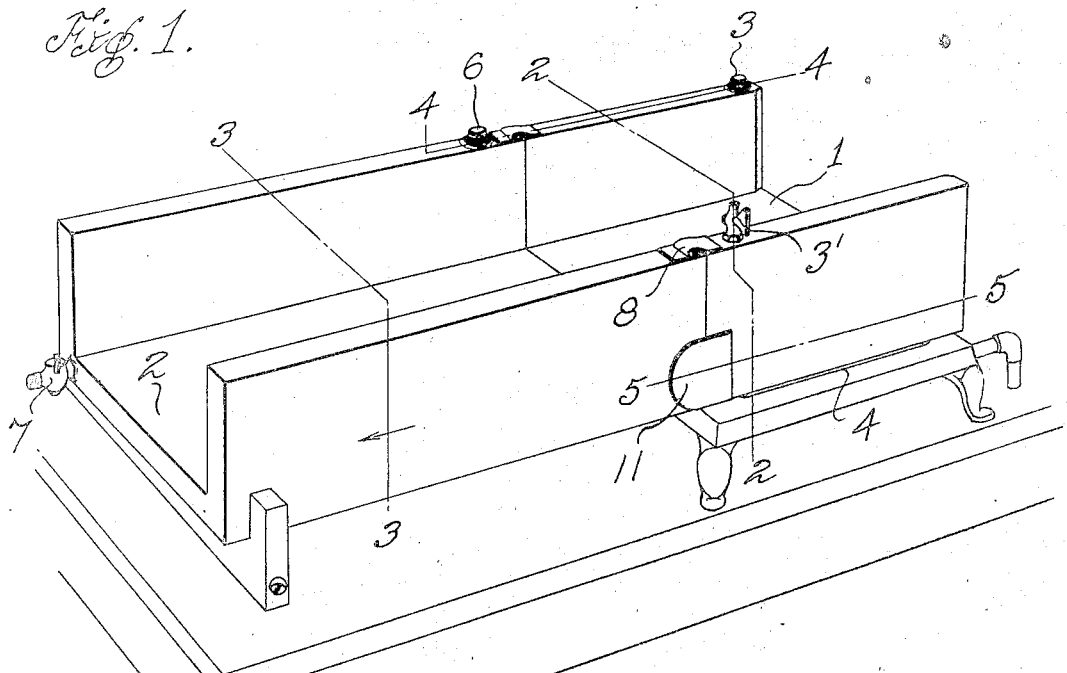
Figure 1 is a perspective view of the improvement, showing the heating trough resting on a stove.
Figure 2:
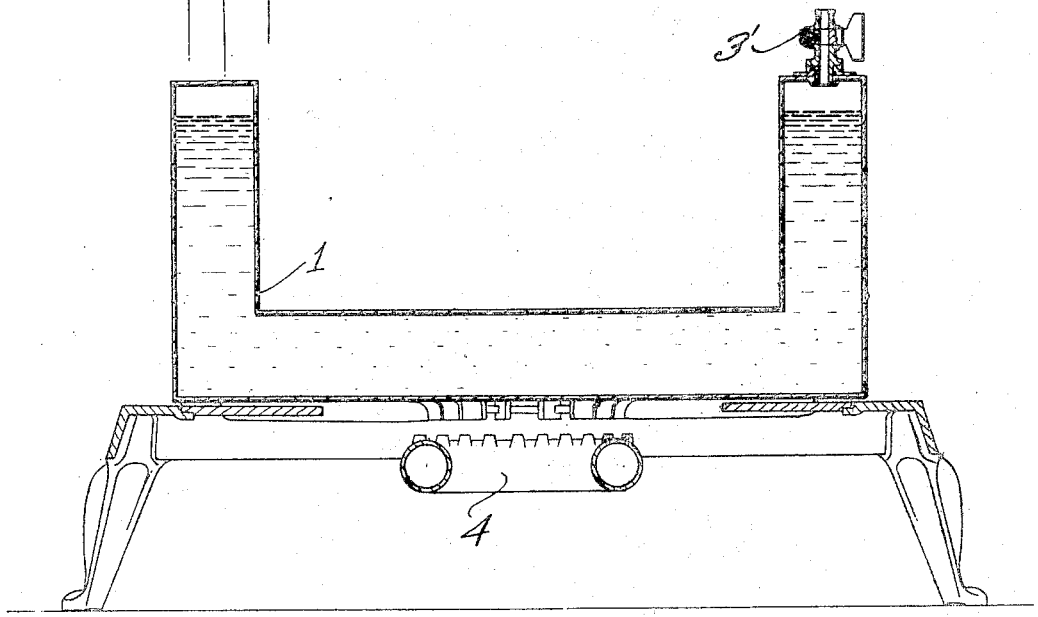
Figure 2 is a transverse sectional view through the heating trough.
Figure 3:
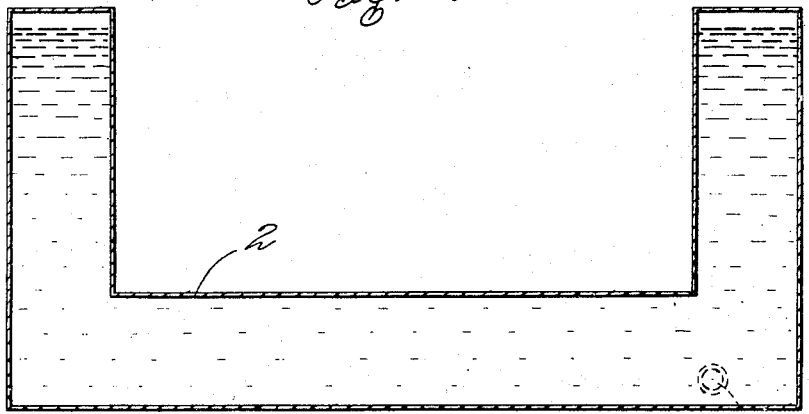
Figure 3 is a similar sectional view through the cooling trough.
Figure 4:
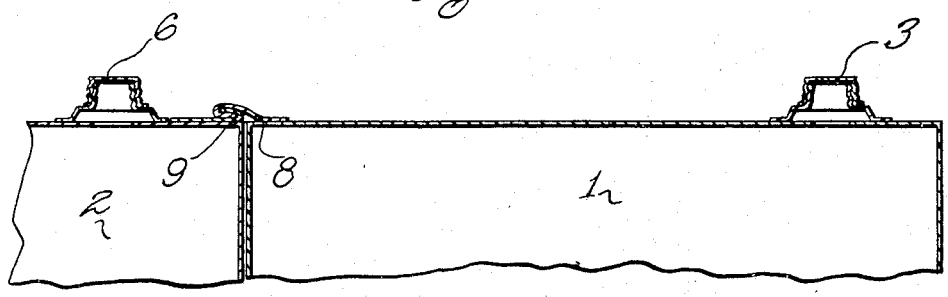
Figure 4 is a sectional view approximately on the line 4—4 of Figure 1.
Figure 5:
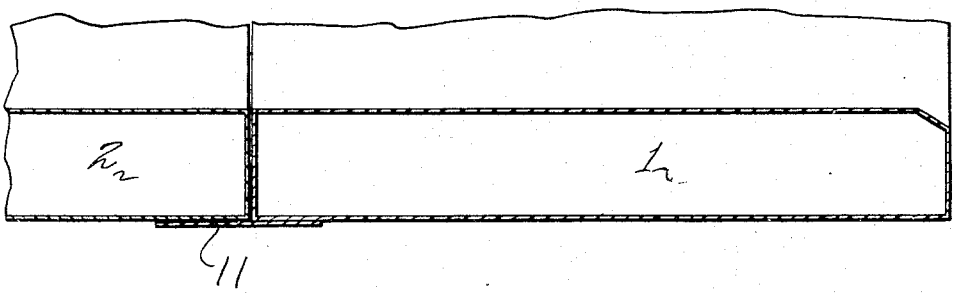
Figure 5 is a sectional view approximately on the line 5—5 of Figure 1.

The trough 1 has one of its sides at the top thereof provided with a water inlet opening and the same being closed by a screw cap 3. The opposite side wall of the trough 1 has an opening in which is screwed, soldered or otherwise secured a blow-off valve 3′, and this valve is always retained in an open condition when the trough 1 is arranged upon a heater 4 as disclosed in Figure 1 of the drawings.

The trough 2 has an upper water inlet opening normally closed by a screw cap 6 and a drain cock 7 at the bottom thereof. The water in the trough 1 will, of course, become heated from the flame of the stove, but water let in the trough 2 is cool. The troughs are brought end to end, the trough 1 having its inner corners provided with hooks 8 to engage upturned lips 9 on the top at the confronting end of the top 2. The trough 1 also has its outer sides formed with projecting ears 11, the same being of metal and designed to exert a tension against the sides of the trough 2.

When a loaf of bread is wrapped in waxed paper, the longitudinal seam or fold of the paper is positioned so that the same will contact with the lower wall of the trough 1 and the end folds are arranged so that they will contact with the inner walls of the said trough 1. The operator moves the wrapped bread through the trough 1, and the heat therefrom will partly melt the wax at the wrapped or folded end of the wrapper to create an adhesive agent at the said folds. This agent is cooled and hardened by its contact with the cool walls and bottom of the trough 2 in the passage of the bread through said trough, and in this manner it will be noted that bread wrapped in waxed paper may be effectively sealed in an expeditious manner by simply passing the same through the trough.

Preferably the outer and inner corners of the trough 1 are disposed at angles to provide a flared entrance mouth to the trough, and while I have herein illustrated and described a preferred embodiment of the improvement as it now appears to me, it is to be understood that I hold myself entitled to such changes therefrom as fall within the scope of what I claim without departing from the spirit of the invention.

Having described the invention, I claim:—

1. In a device for the purpose set forth, troughs, each comprising a hollow shell including a straight base and angle sides, means for removably connecting the confronting ends of the troughs, each of said troughs comprising a water container, and the water in one of said containers designed to be heated.

2. In a device for the purpose set forth, two aligning troughs each comprising a hollow shell, hooks on the end of one trough, lips on the ends of the adjacent trough to be engaged by said hooks, resilient means projecting from the sides of one trough for contacting the sides of the confronting trough, normally closed means for admitting water into both of the troughs, means for heating the water in one of the troughs, a safety valve for said trough, and a water outlet valve for the other trough.

In testimony whereof I affix my signature

JAMES B. ROBBINS.